United States Patent [19]

Steffen et al.

[11] 3,821,661

[45] June 28, 1974

[54] RESONATOR DEVICE FOR THE PRODUCTION OF LASER BEAMS

[75] Inventors: Jurg Steffen, Kehrsatz; Hans-Peter Lortscher, Thun, both of Switzerland

[73] Assignee: Pierres Holding SA, Biel, Switzerland

[22] Filed: Sept. 22, 1972

[21] Appl. No.: 291,825

[30] Foreign Application Priority Data

Sept. 23, 1971 Switzerland ...................... 13934/71

[52] U.S. Cl. ........................ 331/94.5 C, 331/94.5 D

[51] Int. Cl. ........................................... H01s 3/00

[58] Field of Search ............................ 331/94.5

[56] References Cited

OTHER PUBLICATIONS

"Generalized Confocal Resonator Theory," Boyd and Kogelnik, Lasers: A Collection of Reprints with Commentary, 876–898, 1970.

"Resonant Modes in a Maser Interferometer," Fox and Li, B.S.T.J., March 1961, pp. 453–488.

*Primary Examiner*—Ronald L. Wibert
*Assistant Examiner*—Conrad Clark
*Attorney, Agent, or Firm*—Eric H. Waters

[57] ABSTRACT

A resonator device for production of a laser beam comprising two mirrors and a rod-shaped amplifying medium adapted for being excited by pumping means and which is located between the two mirrors, wherein the stability condition $0<g_1 \cdot g_2 <1$ is satisfied for the resonator parameters $g_1$ and $g_2$ and wherein these parameters correspond to the equations:

$$g_1 = \zeta - L/\rho_1 - b/f$$
$$g_2 = \zeta - L/\rho_1 - a/f$$

and that the parameters are located in a rectangular coordinate system with $g_1$ and $g_2$ as axes in a region which is limited by two curves which correspond to the equation:

$$\pm 0.2 f L(1 - g_1 \cdot g_2) = (2g_2 - 1/g_1)\ [b(d/n + b\zeta) + d/2_n\zeta(b^2/f + d/n)] + 1/g_2[a(d/n + a\zeta) + d/2_n\zeta\ (a^2/f + d/n)] + 2ab + d/n\ (a + b)/\zeta$$

wherein one of the curves has the positive sign, the other one has negative sign, and wherein the quantities relate to:

$$g_1 = \zeta - L/\rho_1 - b/f$$
$$g_2 = \zeta - L/\rho_2 - a/f$$
$$\zeta = (1 - d/n f)^{1/2}$$
$$L = \zeta\ (a + b) + d/n - a \cdot b/f$$

wherein: $d$ is the length of the laser rod, $n$ is the index of refraction of the laser rod material, $f$ is the thermal focal length of the laser rod which has been heated by the pumping, and $\rho_1$ and $\rho_2$ are the respective radii of curvature of the two mirrors.

23 Claims, 9 Drawing Figures

$a=0;\ \xi=1;\ \frac{d}{n \cdot f} \ll 1;\ \frac{d}{n \cdot f} \ll 1$

RESONATOR DEVICE FOR THE PRODUCTION OF LASER BEAMS

FIELD OF THE INVENTION

This invention relates to devices for the production of laser beams for the machining workpieces and the like.

BACKGROUND

Resonators are commonly used for the production of laser beams for machining workpieces. Known resonators consist, for example, of a rod-shaped, laser-active material and of two mirrors whose spacing is slightly larger than the length of the associated laser rod.

It has been discovered that when such arrangements are used in industrial production, the quality of produced articles and the reproducibility of the operating conditions are unsatisfactory, and that the efficiency is low. These drawbacks result from the circumstances described below.

The active material warms up as a result of the excitation (pumping), and must be cooled when in continuous operation. This results in a radial temperature gradient in the rod. As will be shown hereinafter, the length of the optical path varies in proportion to the temperature distribution, as a result of mechanical elongation, variation of the index of refraction and further such effects.

The originally plane-parallel rod made of active material appears as a thick bi-convex lens having a focal length $f$ which, in good approximation, is reversely proportional to the irradiated pumping power input. This "thermal" lens influences to a considerable degree the production of the laser beam in the resonator.

It is important for precise machining and especially the drilling of workpieces such as, for instance, watch jewels, that only oscillations in the transverse fundamental mode be produced since they are subject to minimum divergence and since the power variations resulting from the alternating action or interaction of various modes is avoided. When the fundamental mode is enforced in the resonator by using diaphragms, the efficiency, on the one hand, is very small and, on the other hand, the radiation varies as a result of unavoidable variations of the pumping input.

There are known various means for the compensation of the lens effects of the laser medium, for instance, there is known the utilization of negative lenses in the resonator or a corresponding curvature of a laser mirror. An improvement of the efficiency of the transverse fundamental mode, however, can be obtained by these means only if the pumping power input is stable. If the pumping power input varies, the emission varies to an extreme degree.

In one known device (see Swiss Pat. No. 505,677), this disadvantage is removed in that a mirror distance is used which is considerably larger than the length of the active material, and the active material is located in proximity of one of the mirrors. However, this arrangement has the disadvantage that the requirement for mechanical stability is very high. The mutual position and parallelism of both mirrors must be held extremely and precisely constant for many hours or even days, and this is difficult to achieve in industrial production or requires a considerable expenditure.

For this reason, in a further conventional device, the large optical distance of the mirrors has been reduced to a small geometrical distance by means of a telescope provided inside the resonator (see application Ser. No. 229,122, filed Feb. 24, 1972). As a result of this, it is true that the geometric mirror distance is smaller, but a high mechanical stability of the suspension of the telescope is indispensable. Furthermore, the additional telescope elements in a resonator can cause distortions.

SUMMARY OF THE INVENTION

It is an object of the present invention to provide stable laser resonators having relatively small geometric length, without additional elements, solely by the proper dimensioning of the resonators and particularly of the radii of curvature of the mirrors and of the distances between the mirrors and the laser rod, which resonators have a high efficiency of the transverse fundamental mode beam.

The active mode volume $V_0$ of the fundamental mode, which is much smaller in the case of FIG. 2 than the active mode volume $V_m$ of the m-th mode, should not only be relatively large, but also insensitive to variations in operational conditions, i.e., to the variations of the thermal focal length $f$. Correspondingly, the divergence $\alpha_1$ (0) of the fundamental mode light beam at the output mirror $S_1$ is to be very small and insensitive to variations of the thermal focal length f as well. In this respect, it will be noted that variations of the thermal focal length $f$ of a laser rod occur in the industrial utilization of a device for the production of laser beams to a considerably higher degree than in pure laboratory devices for research purposes.

In achieving the above and other objects of the invention, there is provided a resonator device for production of a laser beam comprising two mirrors and a rod-shaped amplifying medium adapted for being excited by pumping means and which is located between said two mirrors, wherein the stability condition $0<g_1 \cdot g_2<1$ is satisfied for the resonator parameters $g_1$ and $g_2$ and wherein said parameters correspond to the equations:

$$g_1 = \zeta - L/\rho_1 - b/f$$
$$g_2 = \zeta - L/\rho_2 - a/f$$

and that the same are located in a rectangular $g_1 \cdot g_2$ diagram in a region which is limited by two curves which correspond to the equation:

$$\pm 0.2 f L (1 - g_1 \cdot g_2) = (2g_2 - 1/g_1) [b(d/n + b\zeta) + d/2_n\zeta (b^2/f + d/n)] + 1/g_2 [a(d/n + a\zeta) + d/2n\zeta (a^2/f + d/n)] + 2ab + d/n (a + b)/\zeta$$

wherein one of the curves has the positive sign, the other one the negative sign, and wherein the quantities relate to:

$$g_1 = \zeta - L/\rho_1 - b/f$$
$$g_2 = \zeta - L/\rho_2 - a/f$$
$$\zeta = (1 - d/n \cdot f)^{1/2}$$
$$L = \zeta (a + b) + d/n - a \cdot b/f$$

wherein: $d$ is the length of the laser rod, $n$ is the index of refraction of the laser rod material, $f$ is the thermal focal length of the laser rod which has been heated by the pumping, and $\zeta$ and L are quantities which are derived from the aforesaid equations.

BRIEF DESCRIPTION OF THE DRAWING

The invention will be more clearly understood from the following detailed description taken in conjunction with the accompanying drawing in which.

DETAILED DESCRIPTION

Figure 1:
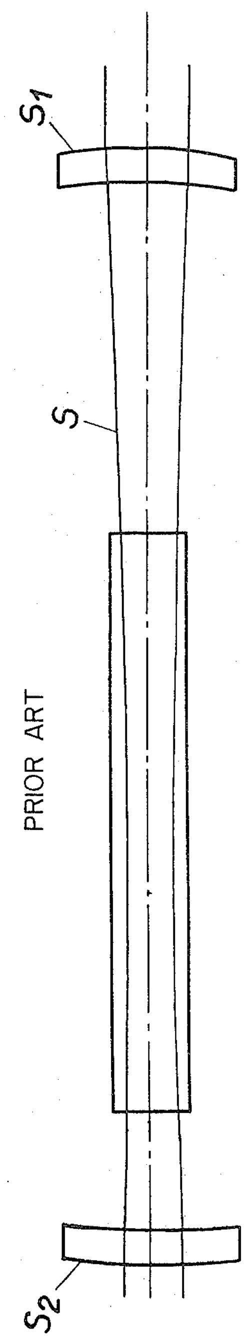
FIG. 1 shows in schematic view a laser beam produced in a conventional resonator with cold laser rod.

FIG. 1 shows in schematic view the limits of a laser beam S produced in a laser resonator defined by the mirrors $S_1$ and $S_2$ with a cold laser rod (Stab) located between the mirrors $S_1$ and $S_2$.

Figure 2:
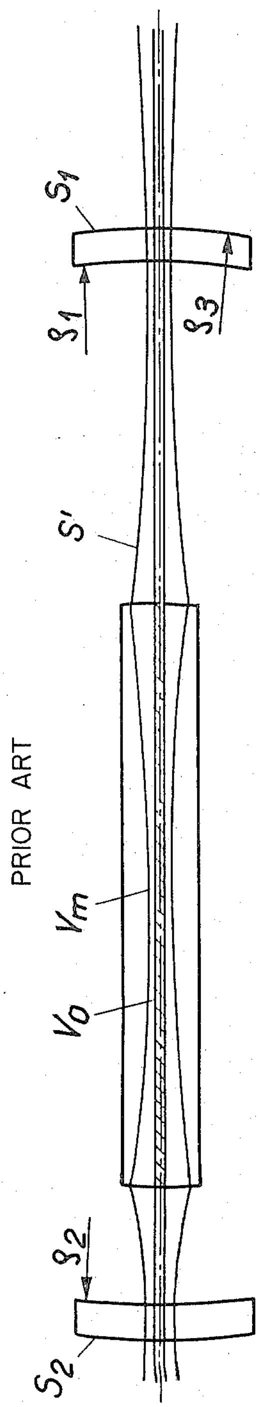
FIG. 2 shows in schematic view a laser beam, produced in a conventional resonator with a laser rod which has been deformed by heating.

FIG. 2 shows the limits of a laser beam S' in the same laser resonator with the laser rod which has been deformed by heating. The mirrors which define the resonator are again designated $S_1$ and $S_2$. The mirror $S_1$ is semi-transparent. The limit of a light beam is assumed to be, in accordance with common practice, that in which the intensity of the light is smaller by a factor $1/e^2$ than that in the center of the light beam ($e$ = 2.781). In operation, i.e., in warmed-up condition of the laser rod, the transverse fundamental mode is limited to a small region S'' around the optical axis, and many modes of higher order can be generated, wherein the maximum possible mode S' is limited by the diameter of the laser rod.

Figure 3:
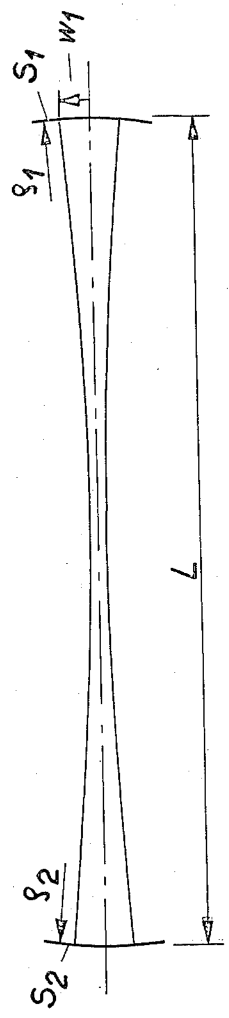
FIG. 3 shows diagrammatically a laser beam in a laser resonator without considering thermal lens effects.

If the optical effects of the laser, particularly its thermal focal length, are neglected, i.e., if a resonator according to FIG. 3 is considered, then the following known stability condition is valid for the same:

$$0 < g_1 \cdot g_2 < 1 \quad (1)$$

wherein $g_1$ and $g_2$ are two resonator parameters, which result from the system of equations:

$$\begin{aligned} g_1 &= 1 - L/\rho_1 \\ g_2 &= 1 - L/\rho_2 \end{aligned} \quad (2)$$

Figure 6:
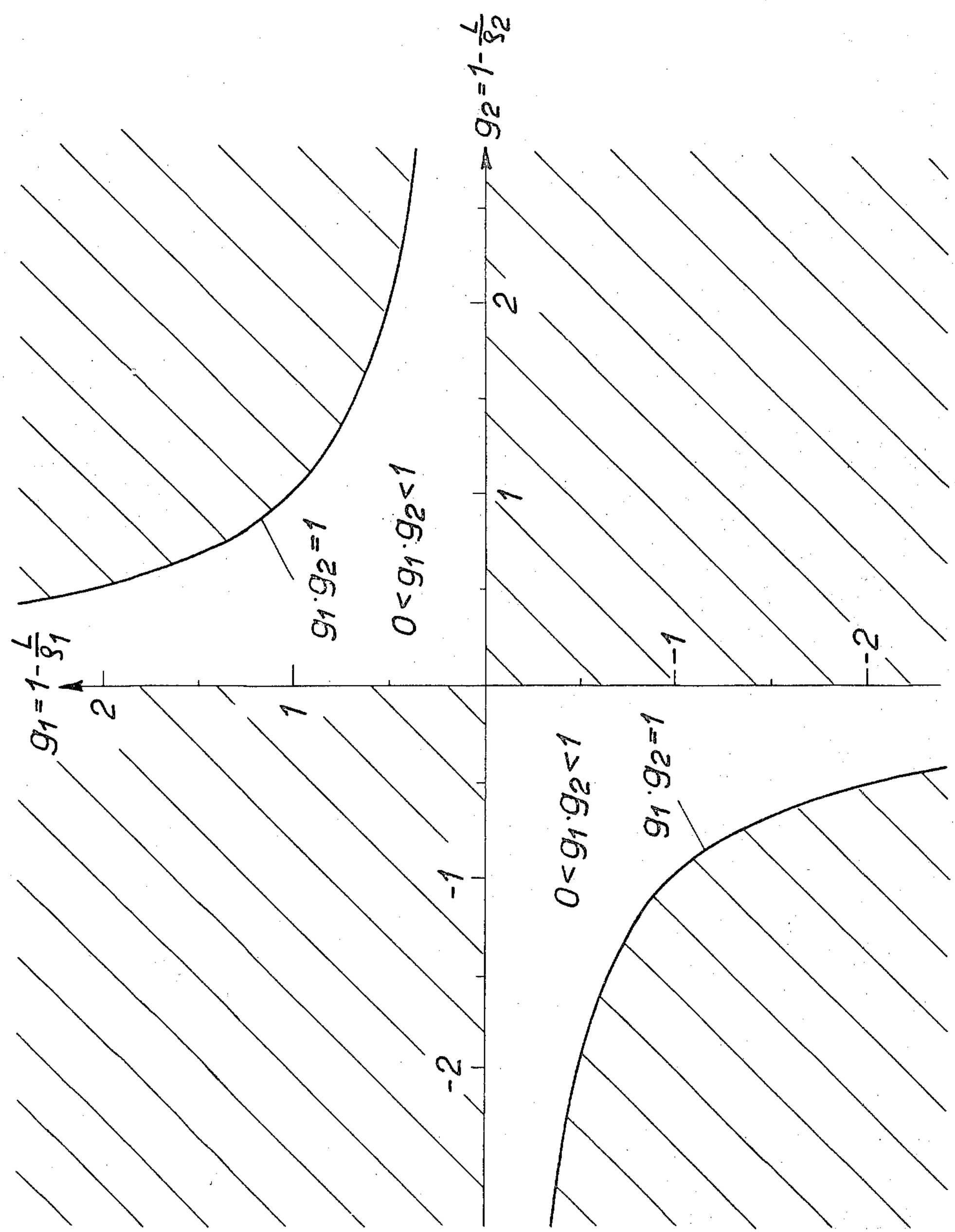
FIG. 6 is the well-known diagram illustrating the stability condition for a laser resonator, each laser resonator being represented by a point in the diagram.

Herein L is the distance between both mirrors $S_1$ and $S_2$, while $\rho_1$ and $\rho_2$ are the radii of curvature of the mirrors $S_1$ and $S_2$, wherein the radii of curvature are considered to be positive for concave mirrors and negative for convex mirrors. The stability condition (1) is shown in diagrammatic view in FIG. 6, wherein $g_2$ is plotted in a rectangular system of coordinate axes on the abscissa and $g_1$ on the ordinate. The hyperbola $g_1 \cdot g_2 = 1$ limits, in the first and third quadrants, two regions in which all pairs of values are accommodated, for which $0 < g_1 \cdot g_2 < 1$. For the pairs of values of $g_1$ and $g_2$ located in the second and fourth quadrant and in the hatched regions of the first and third quadrants, the resonator is unstable.

Thorough mathematical investigations, which cannot be shown here in their entirety, have shown that the stability condition (1) can also be applied to resonators in which the optical effect of the laser rod is taken into consideration by providing a thin lens (FIG. 4) or a thick lens (FIG. 5) between the mirrors $S_1$ and $S_2$.

Figure 4:
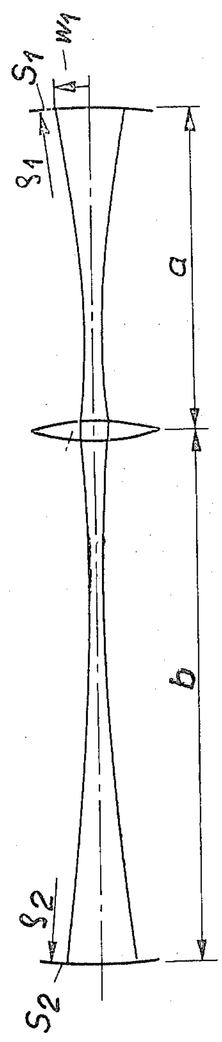
FIG. 4 shows diagrammatically a laser beam in a resonator in which the thermal lens effect is related to the effect of a thin lens.

In the case according to FIG. 4, the system of equations (2) is to be superseded by the following system of equations:

$$\left.\begin{aligned} g_1 &= 1 - L/\rho_1 - b/f \\ g_2 &= 1 - L/\rho_2 - a/f \\ L &= a + b - a \cdot b/f \end{aligned}\right\} \quad (3)$$

wherein $a$ is the distance between the thin lens and the mirror $S_1$ having a radius of curvature $\rho_1$, $b$ is the distance between the thin lens and the mirror $S_2$ having a radius of curvature $\rho_2$, $f$ is the thermal focal length of the laser rod which has been heated by the pumping power input, and L is a length which no longer corresponds exactly to the mutual distance of the mirrors.

Figure 5:
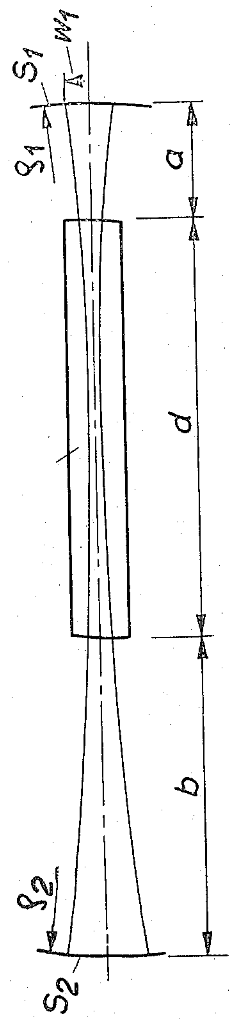
FIG. 5 is a view similar to that of FIG. 4 with the substitution of a thick lens.

In the case according to FIG. 5, the system of equations (2) is to be superseded by the following system of equations:

$$\left.\begin{aligned} g_1 &= \zeta - L/\rho_1 - b/f \\ g_2 &= \zeta - L/\rho_2 - a/f \\ \zeta &= (1 - d/n\,f)^{1/2} \\ L &= \zeta(a + b) + d/n - a \cdot b/f \end{aligned}\right\} \quad (4)$$

wherein $d$ is the length of the laser rod, i.e., the thickness of the lens, $n$ is the index of refraction of the material of the laser rod, $f$ is the thermal focal length of the laser rod which has been heated by the pumping power input, and $\zeta$ and L are calculation quantities which can be derived therefrom.

When it is assumed that $d/n \cdot f << 1$ and $d/n \cdot L << 1$, the system of equations (4) is reduced to the systems of equations (3), and that the latter transforms into the system of equations (2) assuming $a << f$ and $b << f$. If it is only assumed that $d/n \cdot f << 1$, then the systems of equations (3) and (4) differ only by the expression $d/n$ in the equation for L. The transverse fundamental mode light beam has a radius $\omega_1$ (spot radius) on the output mirror $S_1$, which radius is calculated from the following equation:

$$\omega_1 = \sqrt{\lambda \cdot L/\pi}\ [g_2/g_1\ (1 - g_1 \cdot g_2)]^{1/4} \tag{5}$$

wherein $\lambda$ is the wavelength of the produced light beams.

Figure 7:
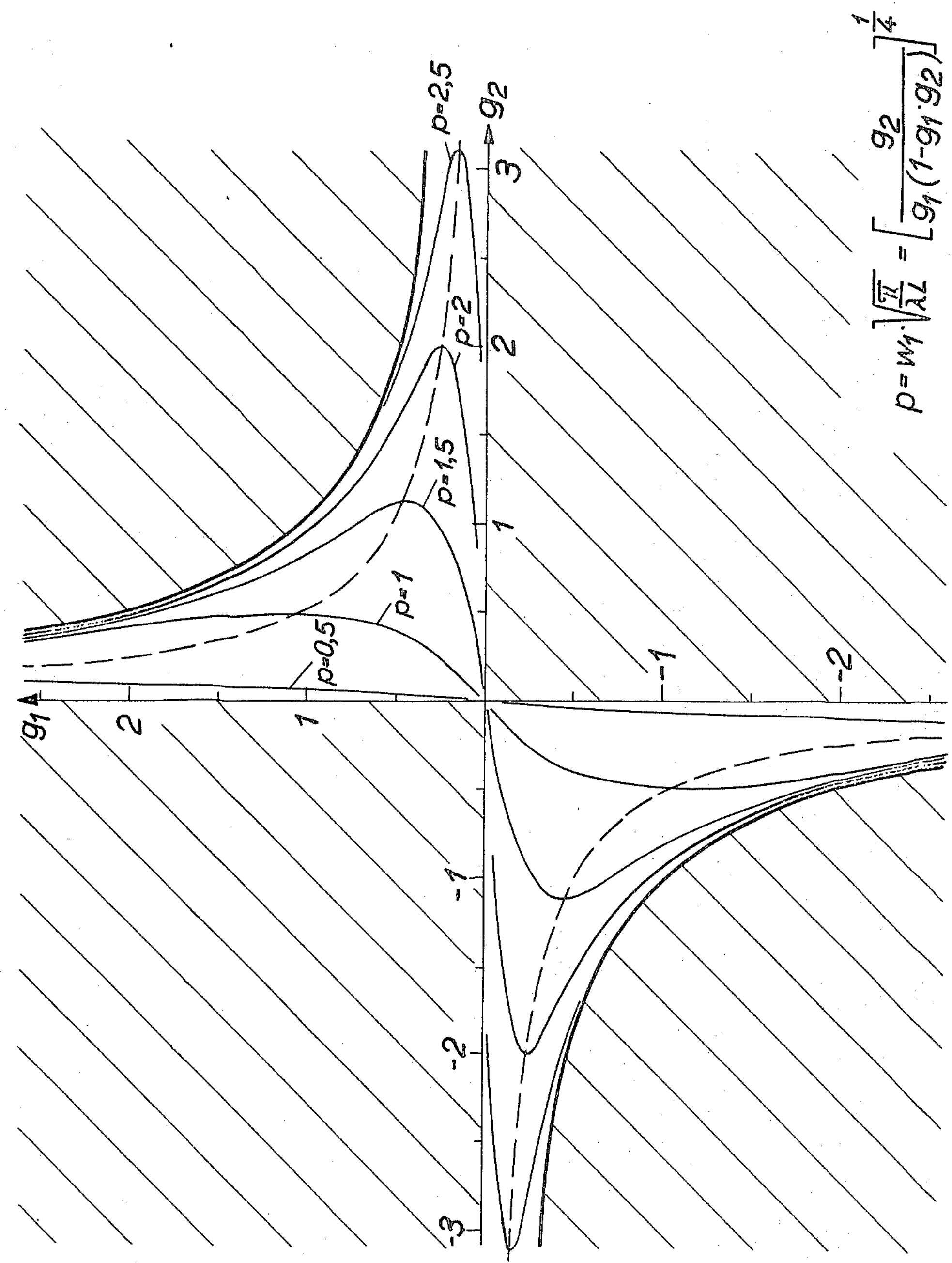
FIG. 7 is a further diagram demonstrating the spot size of the laser beam on mirror 1 for each resonator in the stability diagram.

In FIG. 7, there are shown in the stability region of the $g_1 \cdot g_2$ diagram curves in which a parameter $$p = \omega_1 \cdot \sqrt{\pi/\lambda \cdot L} = [g_2/g_1\ (1 - g_1 \cdot g_2)]^{1/4} \tag{6}$$

which is proportional to the spot radius $\omega_1$ with the constant values $p = 0.5$, 1, 1.5, 2 and 2.5. It is evident that as $p$ and thus also $\omega_1$ are larger, the larger is $g_2$, while for a large $\omega_1$ the fundamental mode volume $V_o$ is large and the divergence $\alpha_1^{(o)}$ of the fundamental mode beam at the output mirror $S_1$ is small.

Preferably $g_2$ is chosen so as to be in the region $1 \leqq 24\ g_2 \leqq 4$. If $g_2 > 4$ were chosen, there would exist the risk that the resonator would leave the stability region, which becomes smaller with growing $g_2$, even as a result of a relatively small variation of $f$, i.e., the resonator would become unstable.

The pairs of values $g_1$, $g_2$ which are located along the curve $g_1 \cdot g_2 = 1/2$ are particularly advantageous, wherein the curve passes through the maxima of the parameter $p$ curves, since it is equally distant for $g_2 > 1$ from the mutually opposing stability limits ($g_2$ axis and curve $g_1 \cdot g_2 = 1$). When the radius $\omega_1$ does not substantially change while the thermal focal length varies, i.e., when $d\omega_1/df \approx 0$, then also $d\alpha_1/df^{(o)} \approx 0$ and $dVo/df \approx 0$, provided that the following equation holds for the outer radius of curvature of the output mirror $S_1$ (see FIG. 2):

$$\rho_3 = \rho_1 \cdot \eta - 1/\eta \tag{7}$$

wherein $\eta$ is the index of refraction of the mirror material.

However, it is not sufficient if the derivation $d\omega_1/df$ disappears for a fixed average value of $f$. It must rather be small in a reasonable region around this average value. Thus, as the most reasonable requirement, it is required that $$d\omega_1/df \cdot f/\omega_1 \approx 0 \tag{8}$$

It can be derived from the system of equations (4) that the equation (8) is satisfied when the pair of values $g_1$, $g_2$ is located along a curve $C_0$ which satisfies the condition:

$$\frac{1}{g_1} = 2g_2 + \frac{1}{g_2}\left(\frac{a}{b}\right)^2 \cdot \frac{\left(\frac{d}{na}+\xi\right)+\frac{d}{2n\xi}\left(\frac{1}{f}+\frac{d}{na^2}\right)}{\left(\frac{d}{nb}+\xi\right)+\frac{d}{2n\xi}\left(\frac{1}{f}+\frac{d}{nb^2}\right)} + 2\,\frac{a}{b}\,\frac{b+\frac{d}{2n\xi}\left(1+\frac{b}{a}\right)}{\left(\frac{d}{n}+b\xi\right)+\frac{d}{2n\xi}\left(\frac{b}{f}+\frac{d}{n.b}\right)} \tag{9}$$

If the focal length $f$ varies from the average value as introduced in the above equation by up to $\pm$ 10 percent, then the spot radius $\omega_1$ varies by less than $\pm$ 0.5 percent in case that the resonator parameters $g_1$,$g_2$ are located in a region which is limited on both sides of the curve $C_o$ calculated from the equation (9) by two curves $C_1$ and $C_2$, which satisfy the equation:

$$\pm 0.2 f L (1 - g_1 \cdot g_2) = (2g_2 - 1/g_1)\ [b(d/n + b\zeta) + d/2n\zeta\ (b^2/f + d/n)] + 1/g_2\ [a(d/n + a\zeta) + d/2n\zeta\ (a^2/f + d/n)] + 2ab + d/n\ (a + b)/\zeta \tag{10}$$

wherein the positive sign is valid for one of the curves and the negative for the other.

For the approximation of a thin lens (FIG. 4), the equation (9) is reduced to the following equation:

$$1/g_1 = 2g_2 + 1/g_2\ (a/b)^2 + 2\ (a/b) \tag{11}$$

For $a = 0$, a special solution of (11) results, namely $$g_1 \cdot g_2 = 1/2 \tag{12}$$

Figure 8:
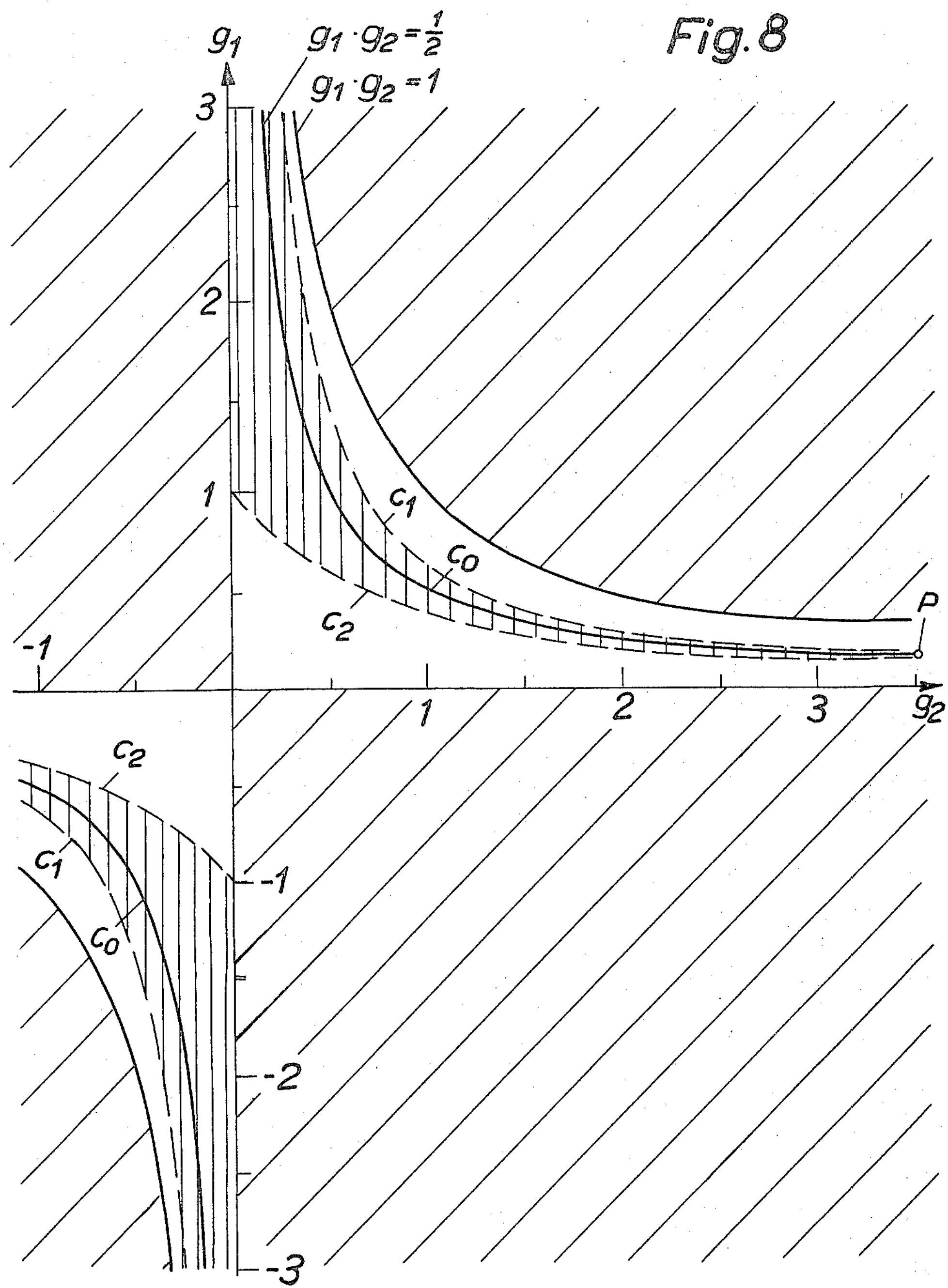
FIG. 8 is a further diagram showing regions of high stability of the resonators in the stability diagram.

This curve, which has already been mentioned in the explanation of FIG. 7, is also illustrated in the $g_1$,$g_2$ diagram according to FIG. 8. For this special $C_o$ curve for $g_1 \cdot g_2$, there are also plotted two special $C_1$ and $C_2$ curves for the approximation of the thin lens and $a = 0$. In the vertically hatched region between the curves $C_1$ and $C_2$, consequently, the spot radius varies by less than $\pm$0.5 percent when the thermal focal length f varies by $\pm$ 10 percent.

In the following, there will be given some data for an example of a resonator according to one embodiment of the invention employing a laser rod made of yttrium-aluminum garnet (YAG), whose average focal length for a pumping power input of, for instance, 600 W amounts to $f_m = 6m$.

Average operational values corresponding to $f_m = 6m$ $$\left.\begin{array}{c} a = 0.1\ m,\ b = 0.7\ m,\ d = 0.05\ m \\ \rho_1 = 1.1\ m\ \text{(decoupling mirror)} \\ \rho_2 = -0.32\ m;\ n = 1.82;\ g_1 = 0.146;\ g_2 = 3.52 \end{array}\right\} \tag{13}$$

Figure 9:
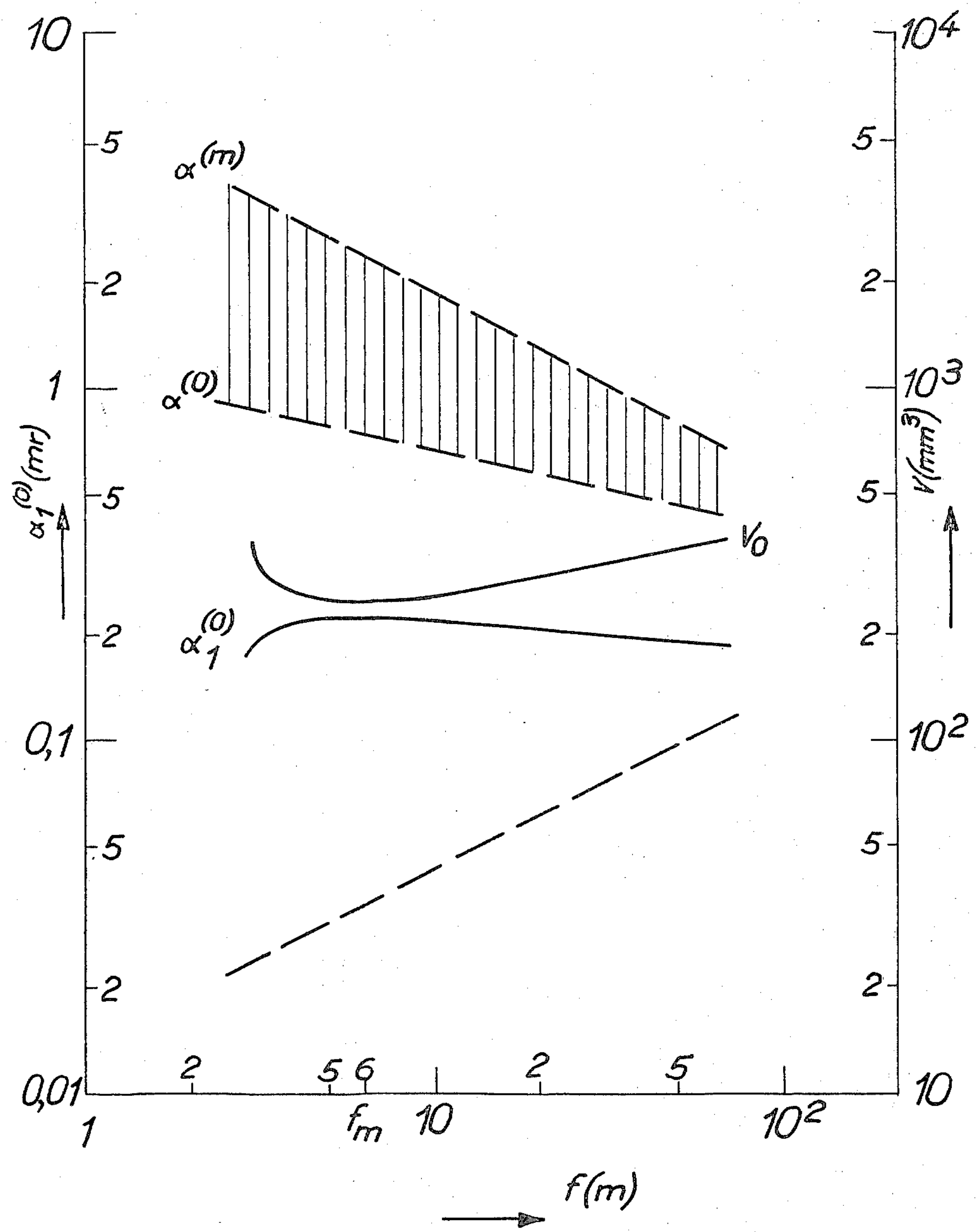
FIG. 9 is a diagram showing beam divergence $\alpha$ and fundamental mode volume V as functions of the focal length of the thermal lens of a laser rod; $V_o$ and $\alpha_1^{(o)}$ are the values corresponding to the invention and V and $\alpha^{(o)}$, $\alpha^{(m)}$ are values of conventional resonators.

The beam divergence $\alpha_1^{(o)}$ and the active fundamental mode volume $V_o$ are shown in FIG. 9 as functions of the focal length $f$. For comparison, there are also plotted the corresponding values $V, \alpha^{(o)}$ and $\alpha^{(m)}$ for a parallel plane resonator having comparable dimensions. According to FIG. 9, it is true that:

$\alpha_1^{(o)}$ of the new resonator (which only oscillates in the fundamental mode) is smaller by a factor of three or 10 respectively than $\alpha^{(o)}$ or $\alpha^{(m)}$, and $V_o$ is larger by a factor of 10 than V.

($\alpha^{(o)}$ = divergence for fundamental mode; $\alpha^{(m)}$ = divergence for the maximally possible transverse mode.);

if f varies by $\pm$ 10 percent about the average value $f_m = 6m$; $V_o$ as well as $\alpha_1^{(o)}$ vary by less than approximately $\pm$0.5 percent, while V, $\alpha^{(o)}$ and $\alpha^{(m)}$ vary considerably.

In FIG. 8, there is shown a point P having the coordinates $g_1$ and $g_2$ corresponding to the equation (13). It can be seen that it is located in the first quadrant between the border curves $C_1$ and $C_2$ where, however, it is to be noted that in the above case somewhat different border curves result from the equations (9) and (10), than those shown in FIG. 8 for the simple reason that $a=0.1\ m$ and thus is not equal to zero, as was the case assumed when the curves $C_1$ and $C_2$ shown in FIG. 8 were calculated. However, the difference is only minute. Values of parameters $g_1$, $g_2$ which are located in the first quadrant are more advantageous than those located in the third quadrant, since the mode volume is larger for the same spot radius.

What is claimed is:

1. A resonator device for production of a laser beam comprising two spaced mirrors and a rod-shaped amplifying means including a laser rod adapted for being excited by pumping means and located between said two mirrors, said device having a stability condition $0 < g_1 \cdot g_2 < 1$ which is satisfied for the resonator parameters $g_1$ and $g_2$ and wherein said parameters correspond to the equations:

$$g_1 = \zeta - L/\rho_1 - b/f$$

$$g_2 = \zeta - L/\rho_2 - a/f$$

said parameters $g_1$ and $g_2$ being selected so as to be located in a rectangular coordinate system with axes $g_1$ and $g_2$ in a region which is limited by two curves which correspond to the equation:

$$\pm 0.2 f L(1 - g_1 \cdot g_2) = (2g_2 - 1/g_1)\ [b(d/n + b\zeta) + d/2n\zeta\ (b^2/f + d/n)] + 1/g_2\ [a(d/n + a\zeta) + d/2_n\zeta\ \ (a^2/f + d/n)] + 2ab + d/n\ (a + b)/\zeta$$

wherein the positive sign is valid for one of the curves and the negative for the other, and $$\zeta = (1 - d/n \cdot f)^{1/2}$$

$$L = \zeta(a + b) + d/n - a \cdot b/f$$

wherein: $d$ is the length of the laser rod, $n$ is the index of refraction of the laser rod material, $f$ is the thermal focal length of the laser rod which has been heated by the pumping and $\rho_1$ and $\rho_2$ are the respective radii of curvature of the two mirrors.

2. A device according to claim 1 wherein $d/n \cdot f << 1$.

3. A device according to claim 2 wherein also $d/nL << 1$.

4. A device according to claim 2 wherein $a \cong 0$.

5. A device according to claim 3 wherein $a \cong 0$.

6. A device according to claim 2 wherein $g_1$ and $g_2$ are located on a curve for which:

$$\frac{1}{g_1} = 2g_2 + \frac{1}{g_2}\left(\frac{a}{b}\right)^2 \frac{\left(\frac{d}{na}+\xi\right)+\frac{d}{2n\xi}\left(\frac{1}{f}+\frac{d}{na^2}\right)}{\left(\frac{d}{nb}+\xi\right)+\frac{d}{2n\xi}\left(\frac{1}{f}+\frac{d}{nb^2}\right)} + 2\,\frac{a}{b}\cdot\frac{b+\frac{d}{-2n\xi}\left(1+\frac{b}{a}\right)}{\left(\frac{d}{n}+b\xi\right)+\frac{d}{2n_j}\left(\frac{b}{f}+\frac{d}{nb}\right)}.$$

7. A device according to claim 3 wherein $g_1$ and $g_2$ are located on a curve for which:

$$\frac{1}{g_1} = 2g_2 + \frac{1}{g_2}\left(\frac{a}{b}\right)^2 \frac{\left(\frac{d}{na}+\xi\right)+\frac{d}{2n\xi}\left(\frac{1}{f}+\frac{d}{na^2}\right)}{\left(\frac{d}{nb}+\xi\right)+\frac{d}{2n\xi}\left(\frac{1}{f}+\frac{d}{nb^2}\right)} + 2\,\frac{a}{b}\cdot\frac{b+\frac{d}{2n\xi}\left(1+\frac{b}{a}\right)}{\left(\frac{d}{n}+b\xi\right)+\frac{d}{2n\xi}\left(\frac{b}{f}+\frac{d}{nb}\right)}.$$

8. A device according to claim 6, wherein $a \cong 0$ and $g_1 \cdot g_2 = 1/2$.

9. A device according to claim 7, wherein $a \cong 0$ and $g_1 \cdot g_2 = 1/2$.

10. A device according to claim 2 wherein $g_1$ and $g_2$ are located in the first quadrant of the $g_1$, $g_2$ system.

11. A device according to claim 3 wherein $g_1$ and $g_2$ are located in the first quadrant of the $g_1 g_2$ system.

12. A device according to claim 10 wherein $1 \leq g_2 \leq 4$.

13. A device according to claim 11 wherein $1 \leq g_2 \leq 4$.

14. A device according to claim 12 wherein $a = 0$.

15. A device according to claim 13 wherein $a = 0$.

16. A device according to claim 14 wherein $f \geq 4$ m.

17. A device according to claim 15 wherein $f \geq 4$ m.

18. A method for establishing optimum dimensions of a resonator device for the generation of a laser beam substantially radiating in the fundamental transverse mode and being substantially insensitive to thermal distortion, the resonator device including a rod-shaped amplifying medium adapted to be excited by pumping means and having a predetermined length $d$ and a known index of refraction $n$, and first and second mirrors having respective radii of curvature $\rho_1$ and $\rho_2$, the first mirror being spaced at a first distance a from one end of the rod-shaped amplifying medium, and the second mirror being spaced at a second different distance $b$ from the other end of the rod-shaped amplifying medium, said method comprising the steps of determining the thermal focal length $f$ of said rod-shaped amplifying medium under operating conditions, regulating said first and second distances $a$ and $b$ such that said first distance $a$ is substantially smaller than said second distance, determining first and second resonator parameters $g_1$ and $g_2$ defined by a set of equations including $$g_1 = \zeta - L/\pi_1 - b/f$$

$$g_2 = \zeta - L/\pi_2 - a/f$$

$$\zeta = (1 - d/nf)^{1/2}$$

$$L = (1 - d/nf)^{1/2}\ (a + b) + d/n - ab/f$$

in such a manner that in a system having said resonator parameters $g_1$ and $g_2$ as respective rectangular coordinates, said resonator parameters $g_1$ and $g_2$ are located within a region limited by two curves defined by the equations $$\pm 0.2\ f\ L\ (1 - g_1 \cdot g_2) = (2g_2 - 1/g_1)\ [b(d/n + b\zeta) + d/2n\zeta(b^2/f + d/n)] + 1/g_2\ [a(d/n + a\zeta) + d/2n\zeta\ (a^2/f + d/n)] + 2ab + d/n\ (a + b)/\zeta$$

wherein the positive sign is valid for one of said two curves and the negative sign is valid for the other of said two curves, said region lying within a range of oscillation stability defined by the product of said resonator parameters $g_1$ and $g_2$, and determining the respective radii of curvature $\rho_1$ and $\rho_2$ of said first and second mirrors from said set of equations.

19. A method according to claim 18 wherein said first distance a is selected to be at least approximately equal to zero.

20. A method according to claim 18 wherein said resonator parameters $g_1$ and $g_2$ are determined in such a manner that in said system they are located on a curve defined by the equation $$\frac{1}{g_1}=2g_2+\frac{1}{g_2}\left(\frac{a}{b}\right)^2\frac{\left(\frac{d}{na}+\xi\right)+\frac{d}{2n\xi}\left(\frac{1}{f}+\frac{d}{na^2}\right)}{\left(\frac{d}{nb}+\xi\right)+\frac{d}{2n\xi}\left(\frac{1}{f}+\frac{d}{nb^2}\right)}+2\frac{a}{b}\frac{b+\frac{d}{2n\xi}\left(1+\frac{b}{a}\right)}{\left(\frac{d}{n}+b\xi\right)+\frac{d}{2n\xi}\left(\frac{b}{f}+\frac{a}{nb}\right)}.$$

21. A method according to claim 20 wherein said first distance a is selected to be at least approximately equal to zero and said product of said resonator parameters $g_1$ and $g_2$ is determined to be equal to a value of one-half.

22. A method according to claim 18 wherein said resonator parameters $g_1$ and $g_2$ are determined to be positive.

23. A method according to claim 22 wherein said second resonator parameters $g_2$ is determined to be in a range of values equal to or greater than one and equal to or smaller than four.

* * * * *